United States Patent [19]

Pedroia

[11] 4,394,987
[45] Jul. 26, 1983

[54] MECHANISM FOR CAUSING THE ROTATION OF THE SPOOL IN A MACHINE FOR TYING A KNOT

[76] Inventor: Luigi Pedroia, Via Cadogno 1, 6648 Minusio, Switzerland

[21] Appl. No.: 251,780

[22] Filed: Apr. 7, 1981

[30] Foreign Application Priority Data

Apr. 14, 1980 [CH] Switzerland .......................... 2832/80

[51] Int. Cl.³ ...................... B65H 75/30; A22C 11/12
[52] U.S. Cl. ....................................... 242/46.2; 17/34; 242/46.4; 242/128; 289/18.1
[58] Field of Search ............. 289/1.5, 2, 18.1; 242/128, 46.2, 46.4; 87/21, 57; 226/120, 134; 57/91; 17/34

[56] References Cited

U.S. PATENT DOCUMENTS

| 1,043,788 | 11/1912 | Petersen | 87/57 X |
| 3,036,785 | 5/1962 | Rossi | 242/46.2 |
| 3,318,623 | 5/1967 | Barroso | 289/18.1 X |
| 3,377,676 | 4/1968 | Fürst | 289/2 X |
| 3,700,249 | 10/1972 | Allam | 242/46.4 X |
| 4,003,290 | 1/1977 | Haehnel et al. | 87/21 X |
| 4,056,243 | 11/1977 | Bilodeau | 242/128 |
| 4,188,053 | 2/1980 | Pujol | 289/18.1 |
| 4,292,879 | 10/1981 | Kokubun | 87/57 |

FOREIGN PATENT DOCUMENTS

| 8101818 | 11/1981 | Netherlands | 17/34 |
| 579351 | 9/1976 | Switzerland . | |

Primary Examiner—Louis Rimrodt
Attorney, Agent, or Firm—Young & Thompson

[57] ABSTRACT

Mechanism for rotating a spool adapted to receive a supply of filament, about the axis of the spool, comprising an electric motor which moves bodily axially toward and away from the spool to make and break the spool drive, respectively. According to the invention, the motor is mounted for limited rotation relative to its support, against the action of a spring, when the tension in the filament increases, thereby to make gradual the rise in tension of the filament. A limit switch is provided to limit this bodily rotation of the motor; and upon actuation of the limit switch, the motor is withdrawn from the spindle, thereby interrupting the spindle drive and releasing the torque that was applied by the filament to the motor, whereupon the motor is rotated by the spring back to a rest position.

3 Claims, 4 Drawing Figures

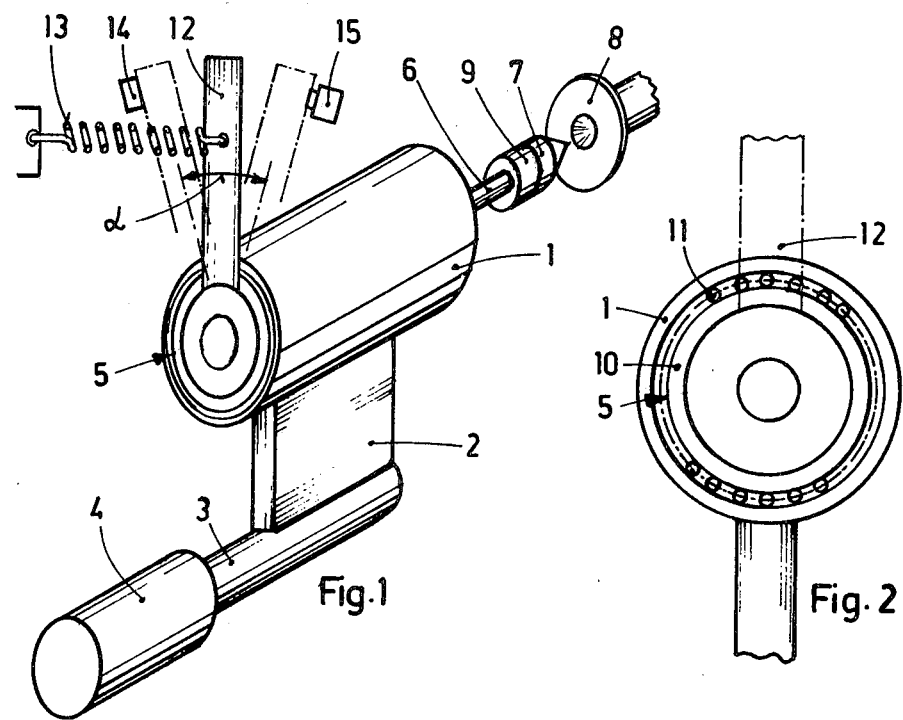
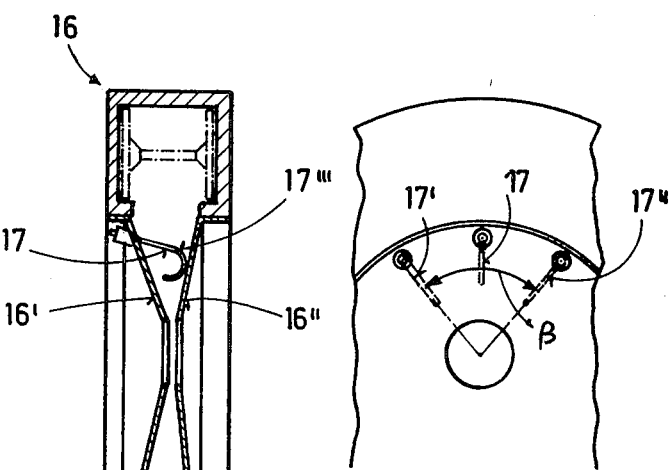
Fig. 1
Fig. 2
Fig. 3
Fig. 4

MECHANISM FOR CAUSING THE ROTATION OF THE SPOOL IN A MACHINE FOR TYING A KNOT

The present invention relates to mechanism for causing the rotation of a spool, for example in a machine for tying a knot. It will be illustrated in connection with a machine for tying knots in sausage casing filled with meat.

In my earlier Swiss Pat. No. 579,351, there is disclosed a knot-tying machine in which an annular cage rotates about a work station disposed along its axis. The cage carries a spool on which is wound a supply of filament; and upon rotation of the cage, the filament from the spool is wound about the object, such as a sausage casing filled with meat, after which tension is applied and the tying operation is completed. Such devices are of course conventional and need not be disclosed in greater detail herein.

In my above-identified Swiss patent, the filament is tensioned by rotation of the spool; and for this purpose, the cage is so positioned that the spool is in axial alignment with a rotary drive shaft which, through a cone clutch, selectively rotates the spool relative to the cage. A drive motor for the shaft of the cone clutch is bodily moved axially, toward and away from the spool, thereby selectively to engage and disengage the clutch, respectively. A cylinder and piston arrangement is provided, for bodily moving the motor coaxially of the spool.

This earlier apparatus was subject to certain drawbacks. Specifically, the filament would occasionally break because of excess tension. Moreover, no provision was made to stop the operation of the motor and of the device itself, even after the filament broke. Finally, the filament was not always kept at uniform tension throughout its length, so that the object being tied, such as a sausage casing, could easily be damaged during the tying operation.

It is accordingly an object of the present invention to overcome the above disadvantages.

Briefly, the present invention achieves its object by providing a device as described, in which the motor that drives the shaft of the cone clutch is adapted itself to rotate bodily about that same axis, to a limited extent, upon the imposition of tension above a certain value of tension in the filament. The motor bodily rotates against the action of a return spring, the extreme rotated position of the motor being determined by a limit switch that causes disengagement of the cone clutch and hence releases the torque applied to the motor, which thereupon is bodily rotated by the spring back to its initial position.

Other objects, features and advantages of the present invention will become apparent from a consideration of the following description, taken in connection with the accompanying drawing, in which:

FIG. 1 is a somewhat schematic perspective view of apparatus according to the present invention;

FIG. 2 is an end elevational view of the supported motor;

FIG. 3 is a cross-sectional view of the cage which carries the spool of filament; and FIG. 4 is a partial front view of FIG. 3.

A good bit of the overall structure of the present invention is in common with that of my above-identified Swiss patent and will be described first. Thus, in the present invention, as in the prior art, there is provided a tubular support 1 for an electric motor, having an arm 2 integral therewith and rigidly coupled to the shaft 3 of a piston 4 driven, for example, by compressed air. Coaxially within support 1 there is mounted a rotary motor 5, preferably an electric motor, having a drive shaft 6 driven in rotation by motor 5. One element of a cone clutch 7 is carried on the outer end of shaft 6, with a friction clutch 9 interposed between cone clutch 7 and shaft 6 to permit slippage of cone clutch 7 relative to shaft 6 upon the imposition of torque above a predetermined maximum.

A spool 8 is provided, on which the filament to be tied is wound. Spool 8 has a complementary female conical recess, which receives the associated element of cone clutch 7 to drive spool 8 about the common axis of members 5–9.

We now come to the structure by which the present invention differs from the prior art.

The motor 5 is provided with an outer casing 10, concentric within support 1. Roller bearings 11 support outer casing 10 of the motor within support 1, so that motor 5 can bodily rotate about its axis through a limited angle.

Fixedly secured to outer casing 10 of motor 5, is an arm 12 which extends radially outwardly. A coil tension spring 13 is anchored at one end and is secured at its other end to arm 12, to urge arm 12 counterclockwise as seen in FIG. 1. The rotation of casing 10 about its axis, in a counterclockwise direction, is limited by a fixed abutment 14. The rotation of arm 12 about that axis in a clockwise direction is limited by an abutmemnt 15 which is provided with a limit switch, preferably of the electric type, which, when actuated by pressure of arm 12, operates the piston and cylinder mechanism 3, 4 by means (not shown), thereby to move the structure 1, 2, 3, 5, 6, 7, 9, 12 bodily toward the lower left as seen in FIG. 1, thereby to disengage cone clutch 7 from its seat in spool 8. The torque previously imposed on motor 5 is thus released by this disengagement, which permits spring 13 to pull lever 12 counterclockwise through an angle α as seen in FIG. 1, into abutment with stop 14.

Thus, it is only after the imposition of maximum tension in the filament, that is, only after the knot has been tied, that the spool drive is disengaged and the device returns to its disengaged rest position.

Furthermore, when the filament breaks, there is no contact, so that the entire machine will be stopped temporarily.

The reverse action of the cylinder and piston assembly 3, 4 is actuated by the spool 8 being in its lower position, which it assumes at the beginning of the next tying operation, in which position a contact (not shown) actuates cylinder and piston assembly 3, 4 to advance the members 7 and 8 into driving engagement with each other. When the spool 8 runs out of filament, it rotates freely without exerting any pressure on the lever.

As also in my above-identified Swiss patent, there is provided an annular cage 16 with reverse conical plates 16', 16" which act as filament guides and which have central openings defining the work station, that is, the tying station. The filament, as in the prior art, follows a path which could be called multilateral or polygonal in the sense of being comprised by a plurality of straight runs. To aid in maintaining the filament with uniform tension throughout these runs, the present invention provides, in addition to the known structure, structure shown at 17, in the form of three wire spring elements 17, 17', 17", having curved ends 17''' and preferably made of spring steel. These elements are mounted about the periphery of member 16' to subtend an arc equal to the angle β, with the result that the filament must overcome the pressure exerted by the elements 17 against the plate 16''. As a result, during the tying operation, the filament is prevented from dragging itself over the casing and being cut thereby.

It will of course be understood that FIG. 1 is highly diagrammatic as to the showing of spool 8: in fact, the spool 8 is of course carried in the cage 16, as shown in FIG. 3, in which position it can be penetrated by cone clutch 7 as diagrammatically indicated in FIG. 1.

It will also be understood that not only does swinging of lever arm 12 in a clockwise direction actuate the contact at 15, but also the swinging of lever 12 against the action of spring 13 ensures a limited rotation of the spool once a substantial tension has developed in the filament, and hence a limited and progressive pulling force on the filament, thereby ensuring an optimum and smooth operation of the machine and greatly reducing the chance of breaking the filament due to the sudden imposition of high tension to the filament.

From a consideration of the foregoing disclosure, therefore, it will be evident that the initially recited object of the present invention has been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. In mechanism for rotating a spool adapted to receive a supply of filament about the axis of the spool, a motor, a clutch member driven by the motor and selectively engageable with the spool to rotate the spool, and means to reciprocate the motor bodily along the axis of the spool to engage and disengage the clutch member thereby to drive and release the spool, respectively; the improvement comprising means mounting the motor for limited bodily rotation about said axis upon an increase in tension in the filament on the spool, and means limiting said bodily rotation of the motor in both directions.

2. Mechanism as claimed in claim 1, in which the motor is an electric motor having an outer casing, a support surrounding said outer casing, and roller bearings between said support and said outer casing.

3. Mechanism as claimed in claim 1, and a lever arm extending radially outwardly from the motor, said limiting means including limit switch means operable to move the motor bodily away from the spool to disengage the motor from the spool upon the attainment of maximum tension in the filament, and spring means to urge the lever away from said limit switch means.

* * * * *